(12) United States Patent  
Scherzinger

(10) Patent No.: US 7,541,974 B2  
(45) Date of Patent: Jun. 2, 2009

(54) MANAGED TRAVERSE SYSTEM AND METHOD TO ACQUIRE ACCURATE SURVEY DATA IN ABSENCE OF PRECISE GPS DATA

(75) Inventor: Bruno Scherzinger, Richmond Hill (CA)

(73) Assignee: Trimble Navigation Limited, Sunnyvale, CA (US)

( * ) Notice: Subject to any disclaimer, the term of this patent is extended or adjusted under 35 U.S.C. 154(b) by 358 days.

(21) Appl. No.: 11/303,676

(22) Filed: Dec. 15, 2005

(65) Prior Publication Data

US 2007/0139262 A1   Jun. 21, 2007

(51) Int. Cl.
*G01S 5/14* (2006.01)
*G01C 21/00* (2006.01)
*G01B 11/24* (2006.01)

(52) U.S. Cl. .................. 342/357.14; 701/217; 356/601
(58) Field of Classification Search .......... 342/357.01–357.17; 701/217; 356/601
See application file for complete search history.

(56) References Cited

U.S. PATENT DOCUMENTS

| | | | |
|---|---|---|---|
| 5,268,695 A | 12/1993 | Dentinger et al. | |
| 5,337,149 A * | 8/1994 | Kozah et al. | 356/601 |
| 5,561,432 A | 10/1996 | Knight | |
| 6,266,628 B1 | 7/2001 | Huep et al. | |
| 6,400,447 B1 | 6/2002 | Kirk et al. | |
| 6,628,308 B1 * | 9/2003 | Greenberg et al. | 715/764 |
| 6,834,234 B2 | 12/2004 | Scherzinger et al. | |
| 6,853,909 B2 | 2/2005 | Scherzinger | |
| 7,076,365 B2 * | 7/2006 | Tzamaloukas | 701/217 |
| 7,188,026 B2 * | 3/2007 | Tzamaloukas | 701/200 |
| 2003/0182053 A1 | 9/2003 | Swope et al. | |
| 2004/0012520 A1 * | 1/2004 | Talbot et al. | 342/357.08 |
| 2005/0060093 A1 * | 3/2005 | Ford et al. | 701/214 |

OTHER PUBLICATIONS

International Search Report dated Dec. 12, 2008, Appln. No. PCT/US2006/047721.
George Siouris, *Aerospace Avionics Systems, A Modern Synthesis*, Academic Press 1993.
Oleg Salychev, *Inertial Systems in Navigation and Geophysics*, Bauman MSTU Press, Moscow 1998.
Principals of Robot Motion, by Howie Choset, et al. The MIT Press (Jun. 4, 2005), ISBN: 0262033275.
Introduction to Autonomous Mobile Roberts (Intelligent Robotics and Autoromous Agents), by Roland Siegwart and Illah R. Nourbakhsh, The MIT Press (Apr. 1, 2004), ISBN: 026219502X.
http://www.cas.kth.se/SLAM/Presentations/hdw-slides.pdf.
http://www.robots.ox.ac.uk/ActiveVision/Papers/davison_iccv2003/davison_iccv2003.pdf.
http://www.acfr.usyd.edu.au/publications/downloads/2002/Williams167/ifac2002Submission.pdf  http://web.media.mit.edu/~rgupta/IROS04jason.pdf Computational Prinicples of Mobile Robotics, Gregory Dudek and Michael Jenkin; Cambridge University Press, Cambridge,2000, ISBN: 0-521-56021-7.

* cited by examiner

*Primary Examiner*—Thomas H Tarcza
*Assistant Examiner*—Harry Liu
(74) *Attorney, Agent, or Firm*—William E. Pelton, Esq.; Cooper & Dunham LLP

(57) ABSTRACT

A method and system obtains precise survey-grade position data of target points in zones where precise GPS data cannot be obtained, due to natural or man-made objects such as foliage and buildings. The system comprises a GPS receiver mounted on a survey pole, with an inertial measurement unit (IMU) and an electronic distance meter (EDM) also mounted on the pole. The system and method obtains GPS data when outside the zone and uses the IMU inside the zone to traverse to a target point, using the EDM to obtain data reduce accumulated errors which occur with the IMU.

25 Claims, 8 Drawing Sheets

MANAGED TRAVERSE SYSTEM AND METHOD TO ACQUIRE ACCURATE SURVEY DATA IN ABSENCE OF PRECISE GPS DATA

BACKGROUND OF THE INVENTION

The present invention is directed to a system and method for obtaining precise survey-grade position data, particularly in areas or zones where precise GPS data cannot be obtained, due to natural or man-made objects such as trees and buildings.

An open technical milestone within the geomatics community is the extension of precise positioning with a GPS survey instrument into areas where some or all of the signals from the GPS satellites are perturbed. This problem has several dimensions that include the technical dimension, the economic dimension and the man-machine interface (MMI) dimension.

The economic dimension is the GPS survey instrument's value proposition that justifies its price of $35K-50K. The value proposition is the significant improvement in efficiency over alternative precise positioning methods that include conventional total stations (CTS), automatic total stations (ATS) and fan lasers. A GPS survey instrument requires one operator and can operate over a broad area of up to 10 km away from its base receiver without relocation of infrastructure. A CTS selling for around $10K requires a crew of two operators and has a range of a few hundred meters. An ATS selling for around $45K requires only one operator, but has a range limit similar to a CTS. Both require a fairly elaborate setup per location. Fan lasers have even shorter range limits and require elaborate and time-consuming installations. Consequently the GPS survey instrument can provide an excellent value proposition so long as it delivers reliable centimeter-level positioning needed for most survey-grade applications.

A surveyor using only GPS is normally able to provide a specified surveyed position accuracy as that from competing survey instructs (examples are CTS, ATS, fan lasers, traditional rod-and-chain). This accuracy is on the order of one centimeter (cm) for precision land survey. It ranges from 10 cm to one meter for lower accuracy survey applications such as cadastral survey 5, geographic information system (GIS) and seismic survey.

The GPS survey instrument's accuracy reliability diminishes when one or more signal lines of sight pass through foliage. Hence the current generation GPS survey instrument is unusable near trees or buildings that can shade, reflect or refract the GPS signals. Such an area is hereafter called a precise-GPS-denied zone. More precisely, a precise-GPS-denied zone is a zone or region where a GPS surveyor cannot provide the required accuracy in locating a point in three dimensional space (for example, accuracy may degrade from 1 cm to 3 cm in a precision land survey due to signal refraction from nearby foliage or buildings). This describes the fact that although a GPS receiver may continue to provide a position solution, it cannot reliably provide a precise survey-grade position solution which has centimeter-level accuracy. If an operator is forced to use a CTS or ATS as frequent backup because of extensive foliage in a job area, then he will likely use the CTS or ATS for the whole job, and not use the GPS survey instrument. The value proposition of the GPS survey instrument thus diminishes in the presence of foliage and/or signal obstructions. Consequently some method of preserving the value proposition is needed, which in turn requires a technical solution to accuracy preservation in precise-GPS-denied zones.

This leads into the technical dimension of the problem. Two possible approaches are to (1) use the compromised GPS signals to maintain centimeter accuracy via a TBD signal processing algorithm, and (2) navigate through precise-GPS-denied zones coverage using some other positioning means. The solution should provide survey-grade precision data to locate objects or targets within the zone.

SUMMARY OF THE INVENTION

The present invention provides a way to navigate through precise-GPS-denied zones and obtain precise survey grade location information of target points within the zone. The method of transiting or traversing across and surveying in a precise-GPS-denied zone is referred to as a "managed traverse." The "positioning means" used in a managed traverse may comprise an integrated positioning system that combines a GPS receiver, an inertial measurement unit (IMU), a laser electronic distance meter (EDM) and a zero velocity indicator (ZVI) switch into a GPS-inertial-EDM (GIE) survey instrument. The GIE survey instrument reverts to a GPS survey instrument when it has access to uncompromised GPS signals. The managed traverse provides a method for traversing a precise-GPS-denied zone using a GIE survey instrument to be executed in a simple fashion by a single operator with no or little risk of losing positioning accuracy. The additional workload penalty imposed by a managed traverse should be significantly less than that of setting up and surveying with a total station in the precise-GPS-denied zone, or else it will generally not be used.

The MMI dimension comes from a requirement to maintain operator familiarity and ease-of-use. The operator should be able to use the GIE survey instrument like a GPS survey instrument with which he is familiar, and to execute a managed traverse quickly, easily and reliably without elaborate training.

As used herein, the term "traversing" means traveling from a start point to an end point, obtaining position information along the way, which is typically relative position information of present location relative to the start point. In one form, this may be done with inertial measurement unit which senses inertial movement (distance and direction) and integrates movement to determine distance and bearing traveled, and thus can determine present position.

According to one aspect of the invention, a method is provided for obtaining position information of a target inside a GPS-denied zone by moving a survey instrument along a trajectory through the zone from a starting point outside the zone to an end point also outside the zone, using the survey instrument to obtain the surveyed positions of a plurality of intermediate points on the trajectory with accuracy specified for the instrument. This is sometimes referred to as a managed traverse.

The present invention provides a method of determining the position of a target comprising the steps of determining the position of a starting point spaced apart from the target, traversing from the starting point to the target while keeping track of positions using a tracking method that is subject to the accumulation of tracking errors, and en route to the target, reducing the accumulated errors by determining position relative to at least one reference location.

The invention provides a method of determining the location of an object in a zone, comprising:
  a. defining a first reference point near the perimeter of the zone;
  b. locating a GPS receiver at a first GPS receiver location outside the zone near the first reference point;

c. determining the position of the GPS receiver at the first GPS receiver location using GPS signals;
d. determining the position of the first reference point relative to the GPS receiver at the first GPS receiver location;
e. traversing, from the first GPS receiver position into the zone, to the location of the object using a tracking method that is subject to the accumulation of errors;
f. obtaining first relative position information of the object location relative to the first reference point;
g. obtaining aiding position information to reduce the accumulation of errors obtained during at least one of steps (e) and (f); and
h. determining the location of the object using the information obtained in steps (c), (d), (e), (f) and (g).

The invention provides a method of determining the location of an object in a zone, comprising:
a. defining first and second reference points near the perimeter of the zone;
b. locating a GPS receiver at a first GPS receiver location outside the zone near the first reference point;
c. determining the position of the GPS receiver, at the first GPS receiver location using GPS signals;
d. determining the position of the first reference point relative to the GPS receiver at the first GPS receiver location;
e. traversing, from the first GPS receiver position into the zone, to the location of the object using a tracking method that is subject to the accumulation of errors;
f. obtaining first relative position information of the object location relative to the first reference point;
g. traversing from the object location to a second GPS receiver position outside the zone and near the second reference point using a tracking method that is subject to the accumulation of errors,
h. locating a GPS receiver at the second GPS receiver location;
i. determining the position of the GPS receiver at the second GPS receiver location using GPS signals;
j. determining the position of the second reference point relative to the GPS receiver at the second receiver location;
k. obtaining second relative position information of the object location relative to the second reference point;
l. obtaining aiding position information to reduce the accumulation of errors obtained during at least one of steps (e), (f), (g) and (k); and
m. determining the location of the object using the information obtained in steps (c), (d), (f), (i), (j), (k) and (l).

The invention provides a surveying system for determining the position of a target in a zone in which precise survey grade location data cannot be obtained using GPS receivers, comprising:
a GPS receiver for determining the position of a starting point near the perimeter of the zone;
a measurement system for obtaining relative position information as one traverses from the starting point to the target, said measurement system subject to the accumulation of tracking errors during said traversal and for obtaining aiding position information to reduce the accumulation of errors during said traversal; and
a processing system for computing the position of the target using the starting point position, the relative position information, and the aiding position information, whereby the position of the target so computed has greater precision than that computed using only relative position information.

The invention provides a surveying system for determining the position of an object in a zone where a GPS receiver cannot locate the object with sufficient precision for survey grade application, comprising:
a position locator for determining the position of a first reference point near a perimeter of the zone using a GPS receiver and GPS signals; said position locator obtaining relative position information of the object location relative to the first reference point during a traversal inside the zone from the first reference point toward the object, accumulating tracking errors during said traversal;
an aiding device for reducing the accumulated tracking errors during traversal to the target inside the zone, by determining position relative to at least one reference location whose position is known.

The invention provides a surveying system for determining the position of a target comprising:
a position locator for determining the position of a starting point spaced apart from the target point, said position locater keeping track of positions, as one traverses from the starting point to the target, using a tracking method which is subject to the accumulation of tracking errors during the traversing, and
an aiding device for reducing the accumulated tracking errors during traversing to the target inside the zone by determining position relative to at least one reference location whose position is known.

DETAILED DESCRIPTION OF THE INVENTION

Figure 1:
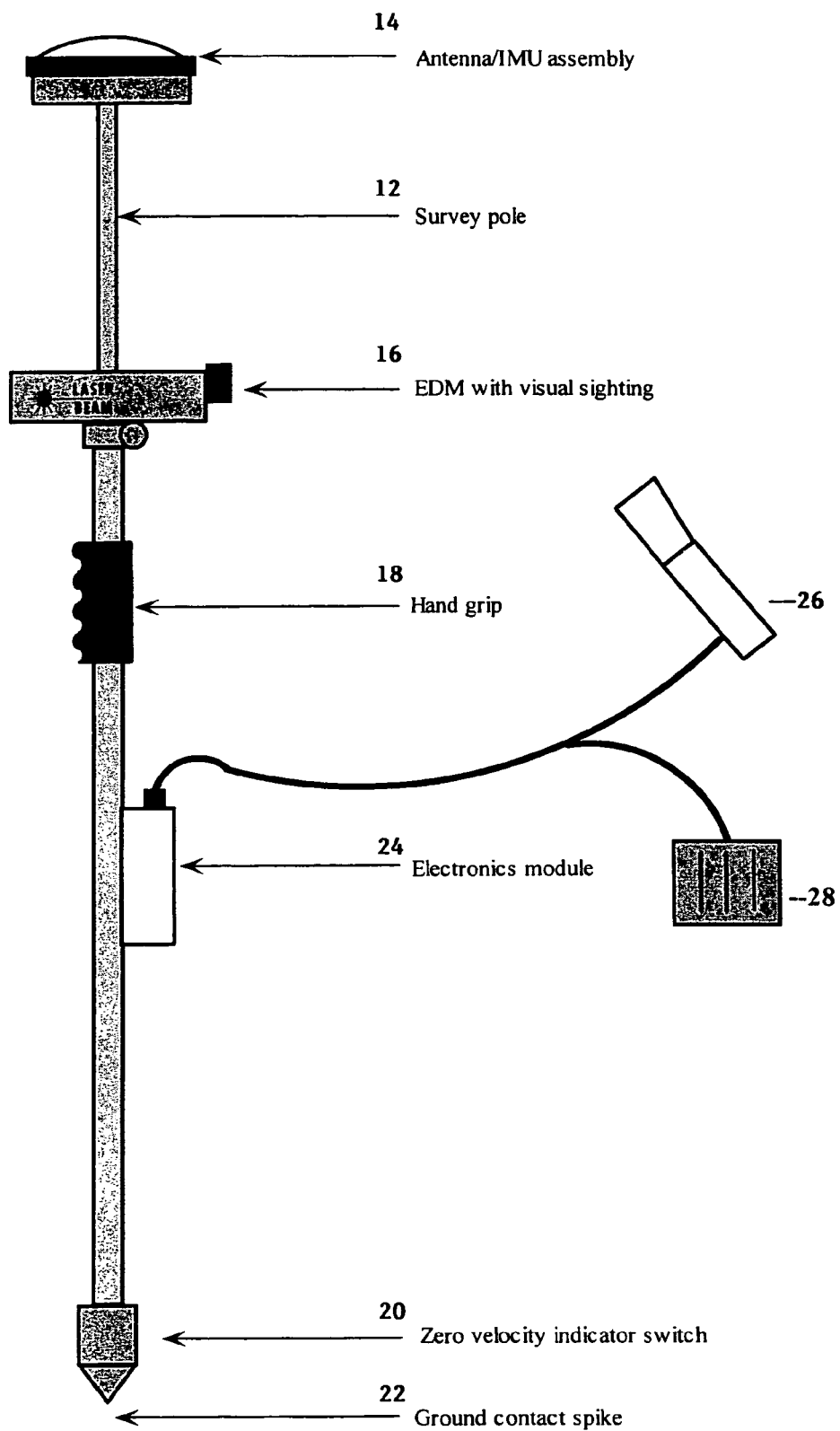
FIG. 1 shows a GIE survey instrument.

The present invention provides a method of determining the position of a target comprising the steps of determining the position of a starting point spaced apart from the target, traversing from the starting point to the target while keeping track of positions using a tracking method that is subject to the accumulation of tracking errors, and en route to the target, reducing the accumulated errors by determining position relative to at least one reference location.

The reference location may be the starting point or may be spaced apart from the starting point.

The step of determining the position of a starting point may comprise using a GPS receiver. The step of traversing may use a tracking method with an IMU. The step of reducing accumulated errors may comprise obtaining aiding information with an EDM.

The invention provides a method of determining the location of an object in a zone, comprising:
a. defining a first reference point near the perimeter of the zone;
b. locating a GPS receiver at a first GPS receiver location outside the zone near the first reference point;

c. determining the position of the GPS receiver at the first GPS receiver location using GPS signals;

d. determining the position of the first reference point relative to the GPS receiver at the first GPS receiver location;

e. traversing, from the first GPS receiver position into the zone, to the location of the object using a tracking method that is subject to the accumulation of errors;

f. obtaining first relative position information of the object location relative to the first reference point;

g. obtaining aiding position information to reduce the accumulation of errors obtained during at least one of steps (e) and (f); and h. determining the location of the object using the information obtained in steps (c), (d), (e), (f) and (g).

The zone may be a region where precise survey-grade position information cannot be obtained using GPS. The step (d) may comprise using an EDM to determine the position of the reference point relative to the GPS receiver at the GPS receiver location. The step (f) may comprise using an EDM to obtain first relative position information of the object location relative to the first reference point. The step (g) may comprise using an IMU to obtain aiding information. The step (a) may comprise locating a retroreflector on the first reference point. The method may further include locating a retroreflector at the object location, and step (f) may comprise using an EDM with a laser to obtain first relative position information. The method may further include using a survey pole with a GPS receiver and EDM mounted thereon. The method may further include using a survey pole with a GPS receiver and IMU mounted thereon. The method may further include using a survey pole with a GPS receiver, EDM and IMU mounted thereon. The step (f) may comprise using an EDM and the step (g) may comprise using an IMU.

The invention provides a method of determining the location of an object in a zone, comprising:

a. defining first and second reference points near the perimeter of the zone;

b. locating a GPS receiver at a first GPS receiver location outside the zone near the first reference point;

c. determining the position of the GPS receiver, at the first GPS receiver location using GPS signals;

d. determining the position of the first reference point relative to the GPS receiver at the first GPS receiver location;

e. traversing, from the first GPS receiver position into the zone, to the location of the object using a tracking method that is subject to the accumulation of errors;

f. obtaining first relative position information of the object location relative to the first reference point;

g. traversing from the object location to a second GPS receiver position outside the zone and near the second reference point using a tracking method that is subject to the accumulation of errors, h. locating a GPS receiver at the second GPS receiver location;

i. determining the position of the GPS receiver at the second GPS receiver location using GPS signals;

j. determining the position of the second reference point relative to the GPS receiver at the second receiver location;

k. obtaining second relative position information of the object location relative to the second reference point;

l. obtaining aiding position information to reduce the accumulation of errors obtained during at least one of steps (e), (f), (g) and (k); and m. determining the location of the object using the information obtained in steps (c), (d), (f), (i), (j), (k) and (l).

The first and second reference points may be different or the same. The first GPS receiver location and the first reference point may be the same. The second GPS receiver location and the second reference point may be the same. The step (d) may comprise using an EDM to determine the position of the first reference point relative to the GPS receiver at the GPS receiver location. The step (f) may comprise using an IMU to obtain first relative position information of the object location relative to the first reference point. The step (l) may comprise using an EDM to obtain aiding information. The step (l) may comprise using an EDM to obtain information on the position of the GPS receiver at the second GPS receiver location relative to first GPS receiver location. The step j) may comprise using an EDM to determine the position of the second reference point relative to the second GPS receiver location. The step (k) may comprise using an IMU to obtain second relative position information of the object location relative to the second reference point. The method may further include locating a retroreflector at the object location, and the steps (f) and (k) may comprise using an IMU to obtain first and second relative position information. The method may further include using a survey pole with a GPS receiver and EDM mounted thereon. The method may further include using a survey pole with a GPS receiver and IMU mounted thereon. The method may further include using a survey pole with a GPS receiver, EDM and IMU mounted thereon. The method may further include using an IMU to obtain information in steps (f) and (k), and step (m) may determine the location of the object using a smoothed estimation process which combines forward and reverse time estimation processes to reduce position error. The zone may be a region where precise survey-grade position information cannot be obtained using GPS.

The invention provides a surveying system for determining the position of a target in a zone in which precise survey grade location data cannot be obtained using GPS receivers, comprising:

a GPS receiver for determining the position of a starting point near the perimeter of the zone;

a measurement system for obtaining relative position information as one traverses from the starting point to the target, said measurement system subject to the accumulation of tracking errors during said traversal and for obtaining aiding position information to reduce the accumulation of errors during said traversal; and a processing system for computing the position of the target using the starting point position, the relative position information, and the aiding position information, whereby the position of the target so computed has greater precision than that computed using only relative position information.

The system may further comprise a survey pole onto which the GPS receiver is mounted, and the measurement system may comprise an EDM with a laser mounted on the pole. The system may further comprise a survey pole onto which the GPS receiver is mounted, and the measurement system may comprise an IMU mounted on the pole. The system may further comprise a survey pole onto which the GPS receiver is mounted, and the measurement system may comprise an EDM with a laser, and an IMU mounted on the pole. The measurement system may obtain relative position information of a plurality of intermediate reference points within the zone as one traverses from the starting point to the target said relative position information at each point being relative to the previous point, and the measurement system may obtain aiding information for at least one of the intermediate reference points by obtaining relative position data from the intermediate reference point to the starting point. The measurement system may comprise an IMU to obtain relative position information, and an EDM to obtain the aiding information.

The invention provides a surveying system for determining the position of an object in a zone, where a GPS receiver cannot locate the object with sufficient precision for survey grade application, comprising:

a position locator for determining the position of a first reference point near a perimeter of the zone using a GPS receiver and GPS signals, said position locator obtaining relative position information of the object location relative to the first reference point during a traversal inside the zone from the first reference point toward the object, accumulating tracking errors during said traversal; and an aiding device for reducing the accumulated tracking errors during traversal to the target inside the zone, by determining position relative to at least one reference location whose position is known.

The invention provides a surveying system for determining the position of a target comprising:

a position locator for determining the position of a starting point spaced apart from the target point, said position locater keeping track of positions, as one traverses from the starting point to the target, using a tracking method which is subject to the accumulation of tracking errors during the traversing, and an aiding device for reducing the accumulated tracking errors during traversing to the target inside the zone by determining position relative to at least one reference location whose position is known.

FIG. 1 shows a GIE survey instrument which comprises a survey pole 12, a GPS receiver and antenna/IMU assembly (AIA) 14, an EDM 16 having a laser beam with visual sighting, a hand grip 18, a zero velocity indicator switch (ZVI) 20 at the bottom of the pole, a ground contact spike 22, and an electronics module 24 to which is connected a data entry unit 26 and battery module 28. The GIE survey instrument provides an inertial navigation system by the IMU assembly 14 and other components on the instrument. The electronics module 24 may contain a processor for processing the data.

The EDM measures range to a target that the operator designates via a sighting telescope that is built into the EDM. During operation, the operator manipulates the entire pole to aim the EDM. This may be cumbersome, hence an EDM that can be aimed separately may be more convenient, and a pair of shaft encoders may be provided to measure the EDM orientation angles with respect to the rest of the instrument. The actual configuration will require a trade-off between simplicity and ease of use.

Figure 3:
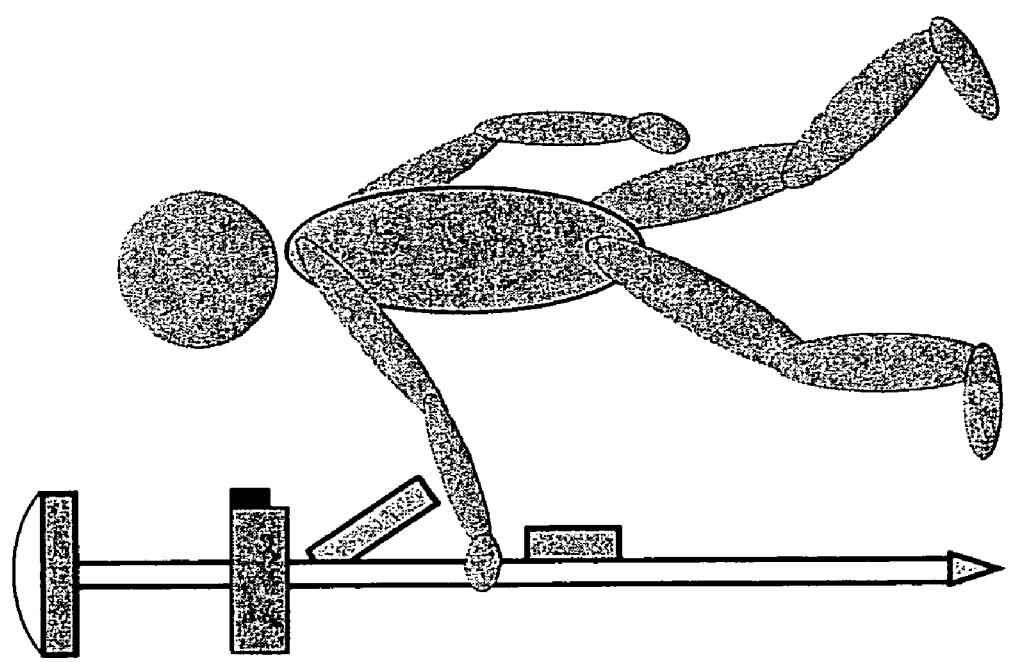
FIG. 3 shows a GIE survey instrument usage.

When the GIE survey instrument has clear access to GPS lines of sight, then it operates like a GPS survey instrument providing precise survey grade location information and the operator does not need to operate the EDM or ZVI. When the GIE survey instrument is unable to provide a location fix, it is operating in a precise-GPS-denied zone, and then the operator manipulates the instrument like a walking stick and obtains location information using EDM and/or IMU. When the ground spike connects with the ground, the ZVI switch closes and thereby signals to the processing software that the ground spike is stationary at its contact point with the ground. The processing software makes use of the zero velocity information to control accumulation of velocity errors. This mechanism is part of a concept called the walking stick navigator (WSN), the details of which are disclosed in my prior U.S. Pat. No. 6,853,909, which is incorporated by reference herein. FIG. 3 shows the basic concept of the WSN being carried by an operator.

Figure 2:
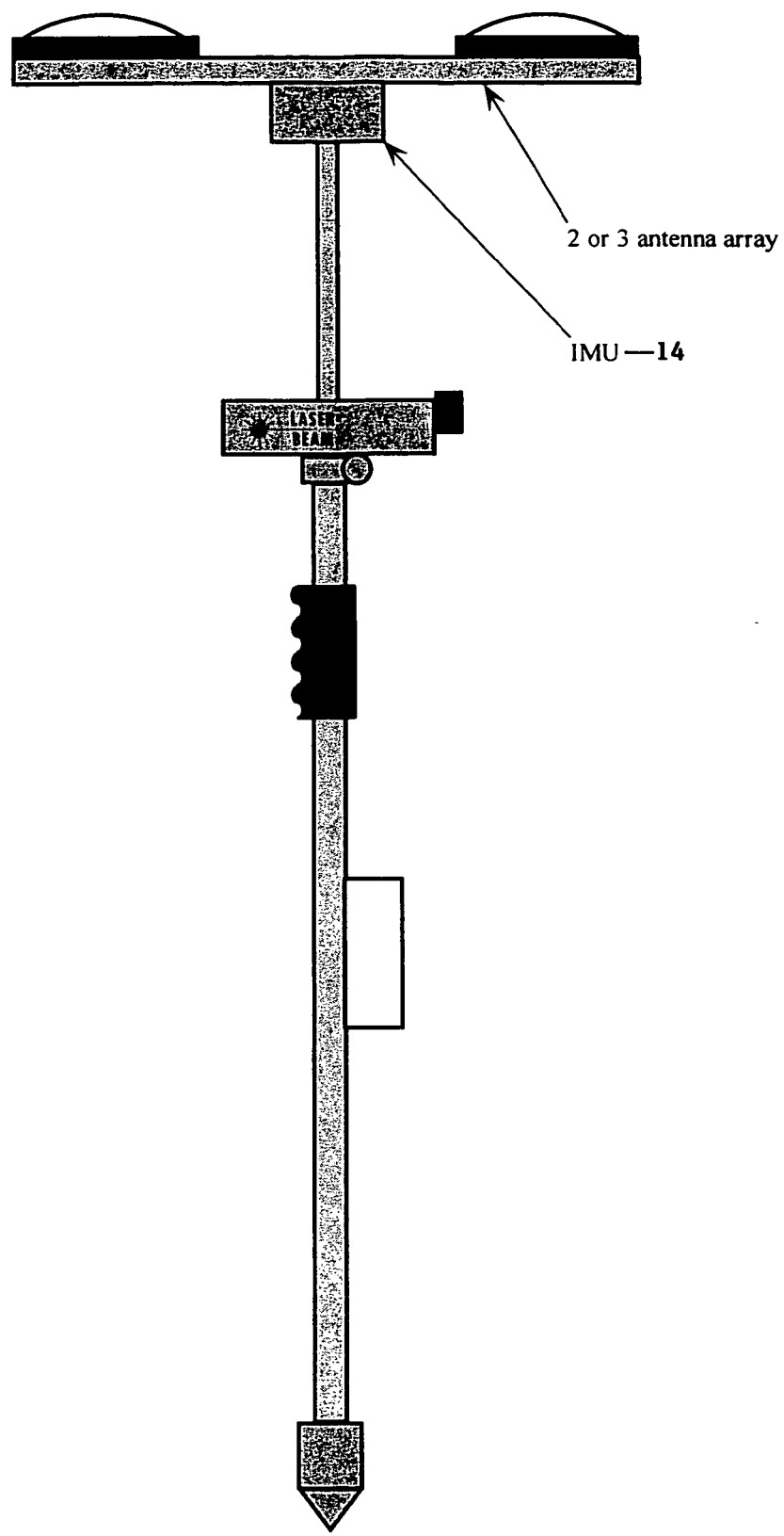
FIG. 2 shows a GIE survey instrument with GPS attitude array.

FIG. 2 shows a variation of the basic GIE survey instrument that includes a two antenna GPS attitude array to aid the inertial navigator. A two-antenna array provides heading aiding, and is typically all that is required to obtain fast heading alignment and continuous heading error control. Roll and pitch are measured using the accelerometers in the IMU. The GIE may have a three-antenna GPS attitude array. In the absence of an IMU, a three-antenna attitude array provides the complete orientation solution.

Figure 4:
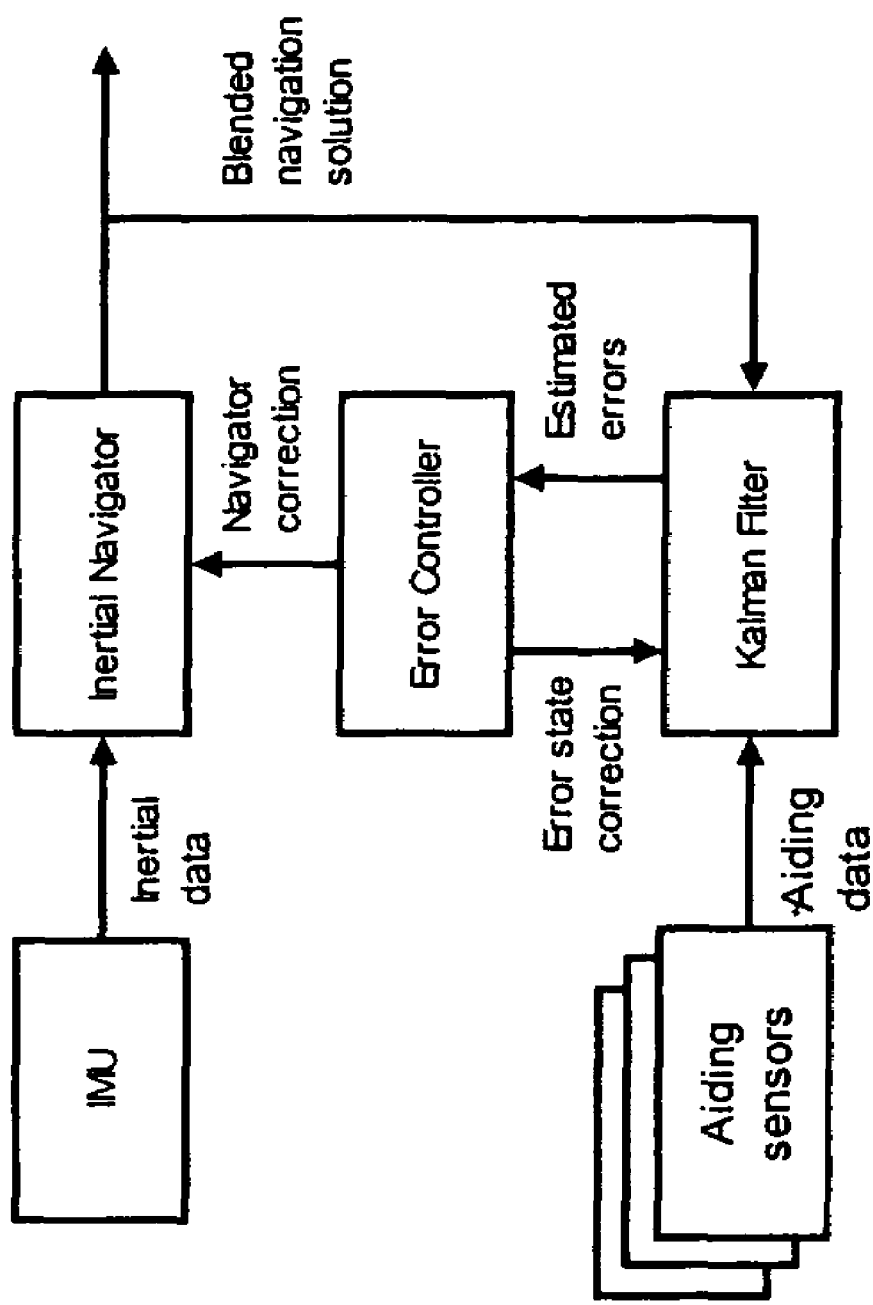
FIG. 4 shows an AINS architecture.

The GIE survey instrument contains an AINS architecture as shown in FIG. 4. This is a standard algorithm for combining inertial data coming from an IMU with other navigation data, here called aiding data, coming from the GPS receiver, ZVI and EDM. The inertial navigator mechanization solves Newton's equations of motion on the earth using the accelerations and angular rates coming from the accelerometers and gyros in the IMU, provided that it has been initialized reasonably well. The initialization process is commonly called alignment. The INS solution comprises the IMU position, velocity and orientation (roll, pitch and heading). The orientation of the IMU can be used as the pointing angles of the EDM laser. Consequently the GIE survey instrument can compute the polar coordinates of a target point with respect to its own position using the IMU orientation and EDM range measurement. Furthermore, an aided inertial navigation system (AINS) Kalman filter can use the EDM range measurements to known target positions to aid the INS and thereby better regulate its position and orientation errors.

Figure 5:
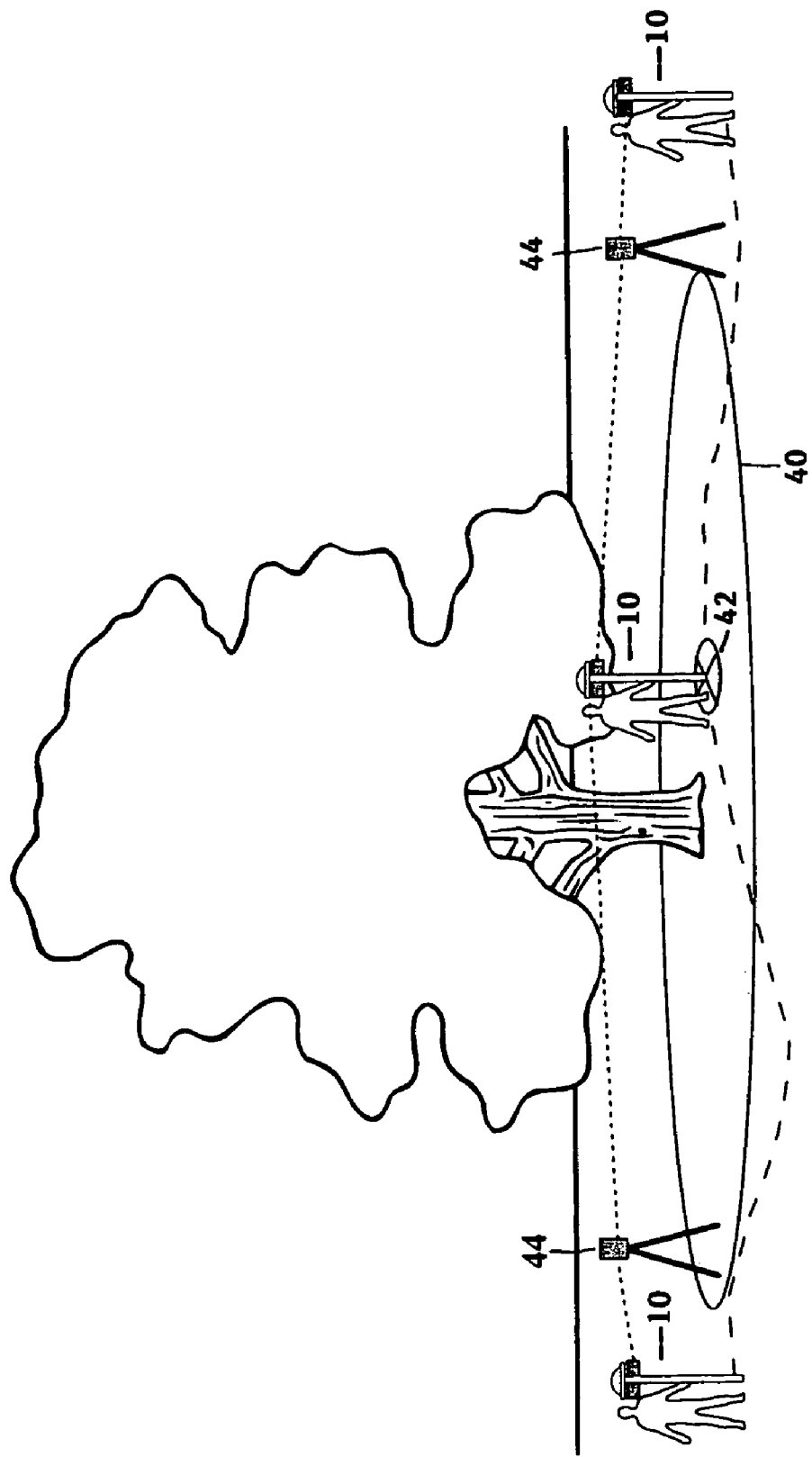
FIG. 5 shows a managed traverse through a precise-GPS-denied zone due to a tree, and a target to be surveyed located under the tree.

The managed traverse method according to the invention provides a method of traversing a precise-GPS-denied zone. FIG. 5 shows a simple example of a precise-GPS-denied zone generated by a tree and a target point 42 to be surveyed located under the tree. The precise-GPS-denied zone is shown by a circle 40. The operator places two or more retro-reflectors 44 near the perimeter of the precise-GPS-denied zone. The retro-reflectors are mounted on light tripods and hence are self-supporting. The operator simply places the retro-reflector tripods on sufficiently solid ground so that they do not move, in a pattern that provides a reasonable trilateration geometry around and in the precise-GPS-denied zone.

The operator then surveys the positions of the retro-reflectors 44 using the GIE survey instrument 10 outside of the precise-GPS-denied zone, where the GIE survey instrument accuracy is at the centimeter level. Because the GIE survey instrument implements an aided INS, it computes the roll, pitch and heading of the instrument and hence the EDM line of sight. This allows the instrument to compute the relative position of the retro-reflector 44 with respect to the GIE survey instrument in terms of polar coordinates (azimuth, elevation, range) and thereby transfer the precise GIE survey instrument position to the retro-reflectors 44. The retro-reflector position error due to roll, pitch or azimuth error will be proportionally related to distance between the GIE instrument and the retro reflector. Typically azimuth error is the largest source of position error in a single polar coordinate measurement of relative position. The operator can perform two or more measurements of the retro-reflector position from different GIE survey instrument positions to obtain statistical averaging of errors and to eliminate the effect of azimuth error by using range trilateration. The operator records the retro-reflector positions for future use in the data logger.

The operator then enters the precise-GPS-denied zone 40, and manipulates the GIE survey instrument in walking stick fashion as described in my prior U.S. Pat. No. 6,853,909. The operator periodically measures ranges to the retro-reflector 44. These steps are used to control the orientation (roll, pitch and azimuth) errors in the GIE survey instrument's aided INS, and to provide aiding information to reduce the accumulation of tracking errors. When the operator reaches the target point, he places the ground spike 22 on the target point 42 and measures ranges to all retro-reflectors 44. The aided INS in the GIE survey instrument computes a precise target point position using these ranges. The operator may then exit the precise-GPS-denied zone 40 in the same way he entered, again in order to control the aided INS orientation errors. Alternatively, the operator may exit the zone at a different location. Whenever the operator exits the zone, he may obtain position information using the GPS receiver.

An IMU typically contains the accelerometers and gyros, and the electronics for digitizing the IMU data. To generate an INS solution, a processing computer may be provided to run the INS equations. The same computer (or processor) can run the other algorithms in an INS. The same computer (or processor) may run the managed traverse in IFNA algorithms in a GIE.

The retro-reflectors may be spheres such as ping pong balls. The advantage of using a sphere as a target is that the measured distance is unbiased from any direction provided the EDM laser spot is on the sphere center. Alternatively, if the GIE instrument remains stationary and the spherical target is rotated through any angle but not displaced, then the distance measured by the EDM will remain unchanged.

Elements of the managed traverse method according to the embodiment are (1) using a GIE survey instrument containing an aided INS, (2) a method of range determination to fixed targets, and (3) a method of surveying the fixed target positions.

The aided INS performs the optimal information blending in its Kalman filter that generates the target position. The method of range determination discussed above was an EDM 16 on the GIE survey instrument and an array of tripod-mounted retro-reflectors. Alternative methods of ranging can also work if they are capable of centimeter level accuracy. One such alternative discussed below is a technique called simultaneous location and mapping (SLAM), which uses video images to extract range to fixed targets in the images.

Figure 6:
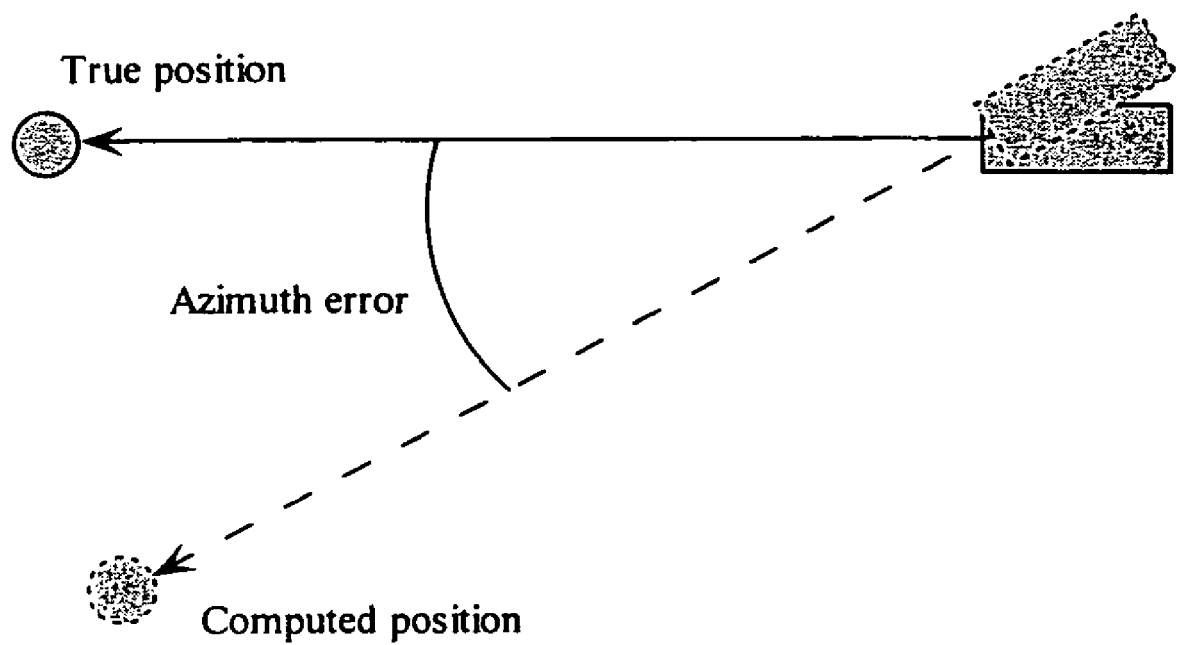
FIG. 6 shows an example of a position error due to azimuth error.

A dead-reckoning system will accumulate position error as it traverses without position information. The GIE survey instrument with laser range aiding will control its position errors during a managed traverse to within the accumulated orientation error. A simple example of how an azimuth error affects the computed target position error is shown in FIG. 6.

Figure 7:
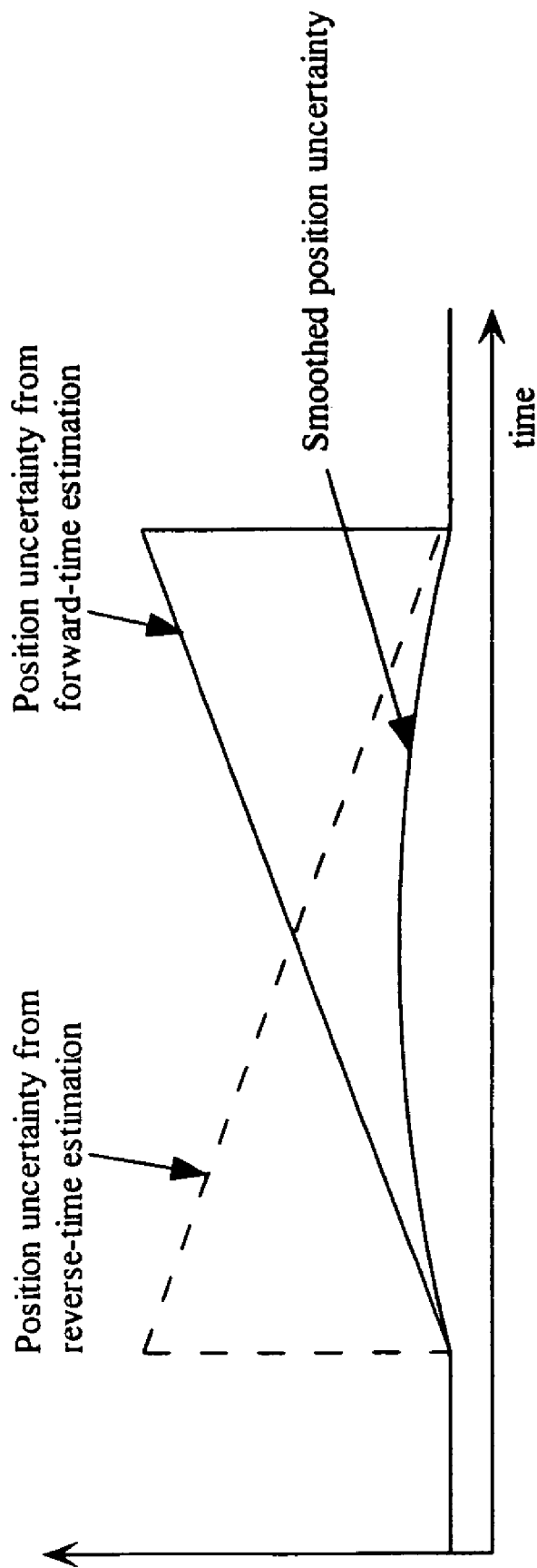
FIG. 7 shows an example of a smoothed position error.

FIG. 7 shows forward-time, reverse-time and smoothed estimation processes. The forward-time estimation process optimally combines current and past information from aiding sensors. The reverse-time estimation process uses current and future information from aiding sensors, and hence can run only in post-processing from recorded data. The smoothed estimation process is an optimal combination of the forward-time and reverse-time estimation processes. The smoothed position error is smaller than either of the forward-time and reverse-time position errors, a consequence of using all past, present and future information at each time point.

The accelerometers and gyros in the IMU contain instrument errors such as biases, scale factor errors and nonorthogonality errors that the AINS Kalman filter attempts to estimate using currently available aiding data. For example, the AINS will accumulate an azimuth error due to the bias in the azimuth gyro that the Kalman filter has been unable to calibrate. A common technique in least-squares estimation to use future information to update a current estimate is smoothing. This involves an estimation process that runs backwards on the data to carry future information to a current estimate. My prior U.S. Pat. No. 6,834,234, incorporated by reference herein, relates to a technique called In-Field Field Network Adjustment (IFNA) that runs a smoother on data segments in general GPS-denied zones. The managed traverse concept may include IFNA to bring precise GPS position information from both ends of the managed traverse to the target position estimation in the middle of the traverse.

The GIE survey instrument implementing IFNA will record all inertial and aiding data during a managed traverse, and will compute a smoothed target survey position once it transits out of the precise-GPS-denied zone. The precise GPS position fixes at either end of the managed traverse will significantly improve the position accuracy in the middle of the traverse. In this case, the improvement will come from the smoothed orientation error combined with EDM range measurements.

An alternative to or an addition to using laser EDM is to use a technique known as Simultaneous Location And Mapping (SLAM). SLAM is a method of using a mobile robot or unmanned vehicle to navigate in an unfamiliar space. SLAM uses sequences of images from one or more video cameras to identify fixed features and then builds a map of these fixed features and the robot's location among them. Two key image processing techniques are applied. One is image segmentation and feature extraction. SLAM uses this to identify particular features that are known to be stationary and hence valid reference points in 3D space. Typical choices are trees in an outdoor setting or light fixtures in an indoor setting. The other technique is stereo imaging to extract depth and hence range-to-feature information. SLAM builds a map of the features in a 3D coordinate grid as it images them from different robot positions, and thereby determines its own position in that grid. The mapping and self-location process is implemented in a single Kalman filter that estimates all variables. Once SLAM has identified reference points via feature extraction, the method of positioning is similar to the previously described positioning method using laser ranges. In this case range extraction is done using stereo imaging from multiple overlapping 2D images. An overview of and descriptions of SLAM techniques may be found in references below.

SLAM techniques can be used in place of or in addition to the EDM in a GIE survey instrument. The instrument may include a video camera with sufficiently small pixel size on the order of less than 2 cm via either a large CCD or a narrow field of view (FOV). The narrow FOV is the less expensive approach but can limit the utility of the instrument since the operator must manually select features and aim the camera at them. A wide FOV allows the camera to capture features automatically, but requires a fine resolution and hence a large CCD array to obtain a centimeter-level pixel size. The instrument would include a SLAM processing algorithm that inputs images at a frame rate dictated by the instrument dynamics (5 frames per second should be adequate for a hand-held instrument) and outputs the positions of the fixed targets it has identified and the instrument position all in a relative Cartesian coordinate frame whose x-y axis is determined by the initial orientation of the instrument. The AINS Kalman filter would then use the SLAM position information in addition to inertial, GPS and zero velocity data to compute the optimal position and to update the SLAM processor's estimates of fixed target positions. If the GIE survey instrument is operated in full RTK mode outside of a precise-GPS-denied zone, then all target position errors can be reduced to 1-2 cm. When the GIE survey instrument enters a precise-GPS-denied zone, then SLAM plus AINS orientation data provides the position information to maintain RTK position accuracy.

The SLAM image segmentation and feature extraction algorithm can be designed for a particular feature such as an unusual shape and/or color, selected to make segmentation and extraction simple and reliable. The operator may deploy tripods carrying this feature in place of the retro-reflectors described previously. This would ensure that the desired features for SLAM are always present. It would also simplify the SLAM software running in the SLAM processor and possibly the design of the video camera.

Figure 8:
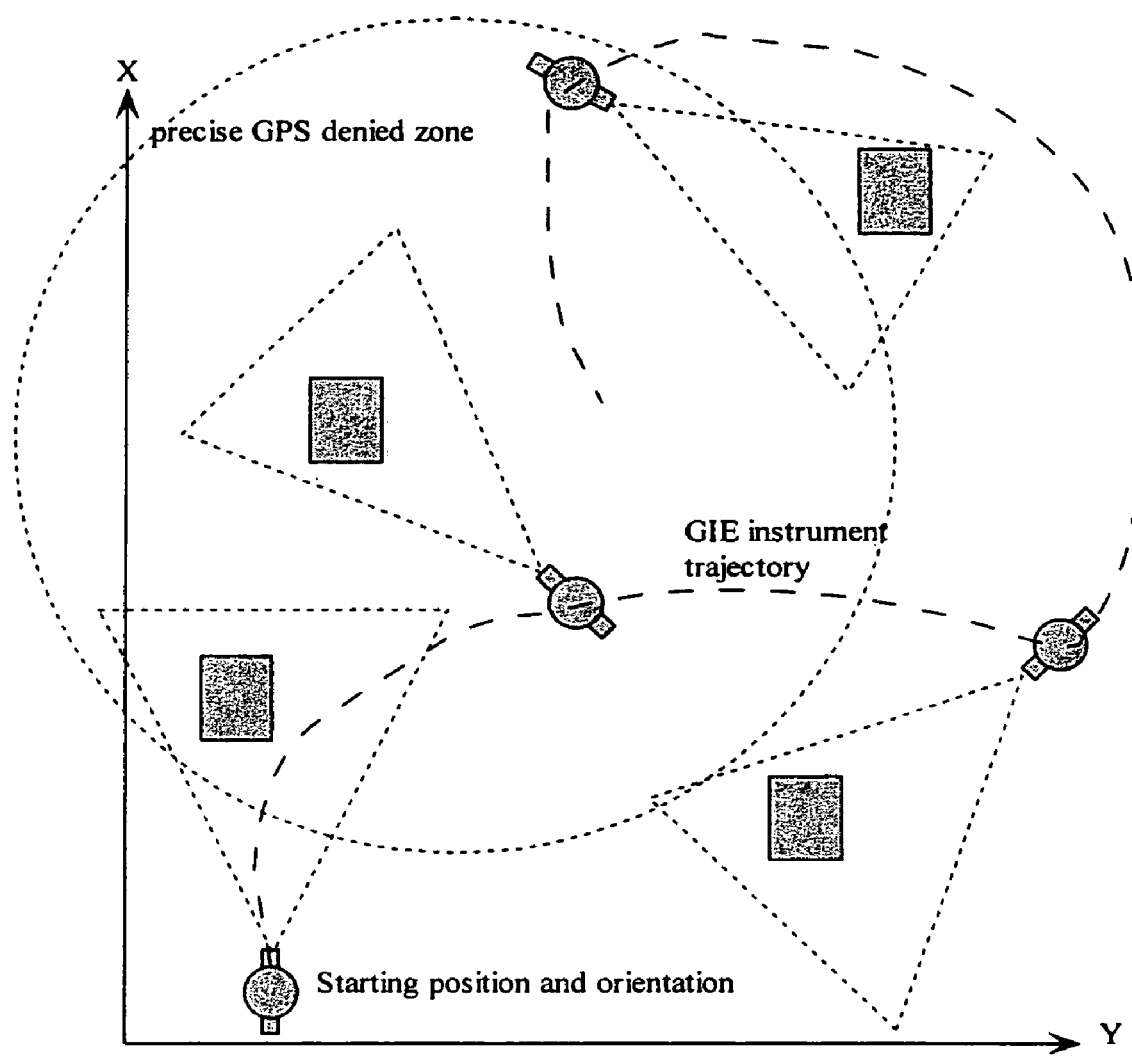
FIG. 8 shows a typical SLAM navigation through field of targets, either naturally occurring or placed by the operator.

FIG. 8 shows how a GIE survey instrument might navigate through a field of targets, either naturally occurring or placed by the operator. A proper SLAM-based GIE survey instrument mission should be designed so that the camera can view the targets with sufficiently strong geometry to allow their simultaneous position measurement and positioning of the instrument.

The following references, incorporated by reference herein, provide additional information relative to the invention.

1. George Siouris, *Aerospace Avionics Systems, A Modern Synthesis*, Academic Press 1993.
2. Oleg Salychev, *Inertial Systems in Navigation and Geophysics*, Bauman MSTU Press, Moscow 1998.
3. U.S. Pat. No. 6,853,909.
4. U.S. Pat. No. 6,834,234.
5. U.S. Pat. No. 6,266,628
6. U.S. Pat. No. 5,268,695
7. U.S. Pat. No. 5,561,432
8. *Principles of Robot Motion*, by Howie Choset, et al The MIT Press (Jun. 4, 2005), ISBN: 0262033275.
9. Introduction to Autonomous Mobile Roberts (Intelligent Robotics and Autoromous Agents), by Roland Siegwart and Illah R. Nourbakhsh, The MIT Press (Apr. 1, 2004), ISBN: 026219502X.
10. Computational Principles of Mobile Robotics, by Gregory Dudek and Michael Jenkin.
11. Some links to SLAM literature on the Internet include:
http://www.cas.kth.se/SLAM/Presentations/hdw-slides.pdf
http://www.robots.ox.ac.uk/ActiveVision/Papers/davison_iccv2003/davison_iccv2003.pdf
http://www.acfr.usyd.edu.au/publications/downloads/2002/Williams167/ifac2002Submission.pdf
http://web.media.mit.edu/~rgupta/IROS04jason.pdf The following is a table of abbreviations used herein:
AIA antenna/IMU assembly
AINS aided inertial navigation system
ATS automatic total station
CCD changed coupled device
CTS conventional total station
EDM electronic distance meter
FOV field of view
GIE GPS-inertial-EDM
GIS geographic information system
GPS global positioning system
IFNA in-field field network adjustment
IMU inertial measurement unit
INS inertial navigation system
MMI man-machine interface
RTK real time kinematic
SLAM simultaneous location and mapping
TBD to be determined
WSN walking stick navigator
ZVI zero velocity indicator

What is claimed is:

1. A method of determining the location of a target with survey grade precision in a zone where survey-grade precision cannot be achieved using satellite signals, comprising:
    defining at least one fixed reference point;
    locating a fixed starting point outside the zone using satellite signals to obtain the location thereof:
    determining the location of said fixed reference point using range and bearing information relative to said fixed starting point;
    traversing from said fixed starting point to the target using a tracking method within the zone that does not use satellite signals for determining locations along the traverse and is subject to the accumulation of tracking errors; and
    reducing accumulating tracking errors by determining locations along the traverse using range and bearing information relative to said at least one fixed reference point; and using said tracking method to determine the location of the target with survey grade precision.

2. The method according to claim 1, wherein the step of locating a fixed starting point outside the zone comprises using a receiver for a global navigation satellite system.

3. A method for determining the location of a target within a zone in which satellite signals are ineffective for obtaining error-free location, the method comprising the steps of: defining at least one fixed location outside the zone: determining the location of at least one fixed reference point using range and bearing information relative to said at least one fixed location: manipulating a positioning system subject to accumulative errors in determining location along a traverse of the zone to the target: using sad positioning system periodically along the traverse to obtain range and bearing information relative to at least one of a fixed reference point and a fixed location: using said range and bearing information relative to at least one of a fixed reference point and fixed location to reduce accumulated errors of said positioning system and using said position system to determine the location of the target.

4. The method of claim 3 in which the step of defining one or more fixed locations outside the zone comprises using a sensor for determining location based upon satellite signals.

5. The method according to claim 4, wherein the sensor for determining location based upon satellite signals is a receiver for global navigation satellite system.

6. The method of claim 4 in which a reflective surface is located at said at least one fixed reference point.

7. The method of claim 6 in which the step of determining the location of said at least one fixed reference point comprises using an EDM located at one of said fixed locations outside the zone to obtain the location of at least one of said reflective surfaces relative to the location of said EDM.

8. The method of claim 7 in which the step of determining the location of the target comprises locating said EDM at the target and using said EDM to obtain the location of the target relative to the location of said at least one of said reflective surfaces.

9. The method of claim 6 in which each reflective surface comprises a reflective sphere.

10. The method of claim 6 in which each reflective surface comprises a retroreflector.

11. The method of claim 3 in which the traverse extends from a known starting location, and the positioning system includes at least one positioning method that does not use satellite signals for determining location, said starting location being one of a fixed location outside the zone and a fixed reference point.

12. The method according to claim 11 in which each fixed location outside the zone is determined by said sensor for determining location based upon satellite signals, said sensor being mounted on survey pole.

13. The method of claim 12 in which said positioning method comprises using an EDM mounted on said survey pole.

14. The method according to claim 13 in which said positioning method comprises using an IMU mounted on said survey pole.

15. The method of claim 14 in which said positioning method comprises locating said survey pole at the target.

16. The method according to claim 11, wherein said positioning method comprising using at least one of an IMU and an EDM during the traverse.

17. The method of claim 16 comprising using said range and bearing information to reduce errors in location determined by said positioning method.

18. The method of claim 16 in which said positioning method comprises using an IMU.

19. The method of claim 18 in which said positioning method further comprises using an EDM.

20. The method of claim 19 in which errors in location determined by said position method are reduced by processing position information with an INS Kalman filter.

21. The method according to claim 17, in which errors in location determined by said positioning method are reduced by using a smoothed estimation process which combines forward and reverse time estimation processes.

22. The method of claim 3 comprising defining a plurality of fixed location outside the zone.

23. The method of claim 3 comprising determining the location of a plurality of fixed reference points.

24. The method of claim 23 in which at least one fixed reference point is inside the zone.

25. The method of claim 3 in which said positioning system obtains range and bearing information relative to each of a plurality of said fixed reference points.

* * * * *